United States Patent Office 3,217,944
Patented Nov. 16, 1965

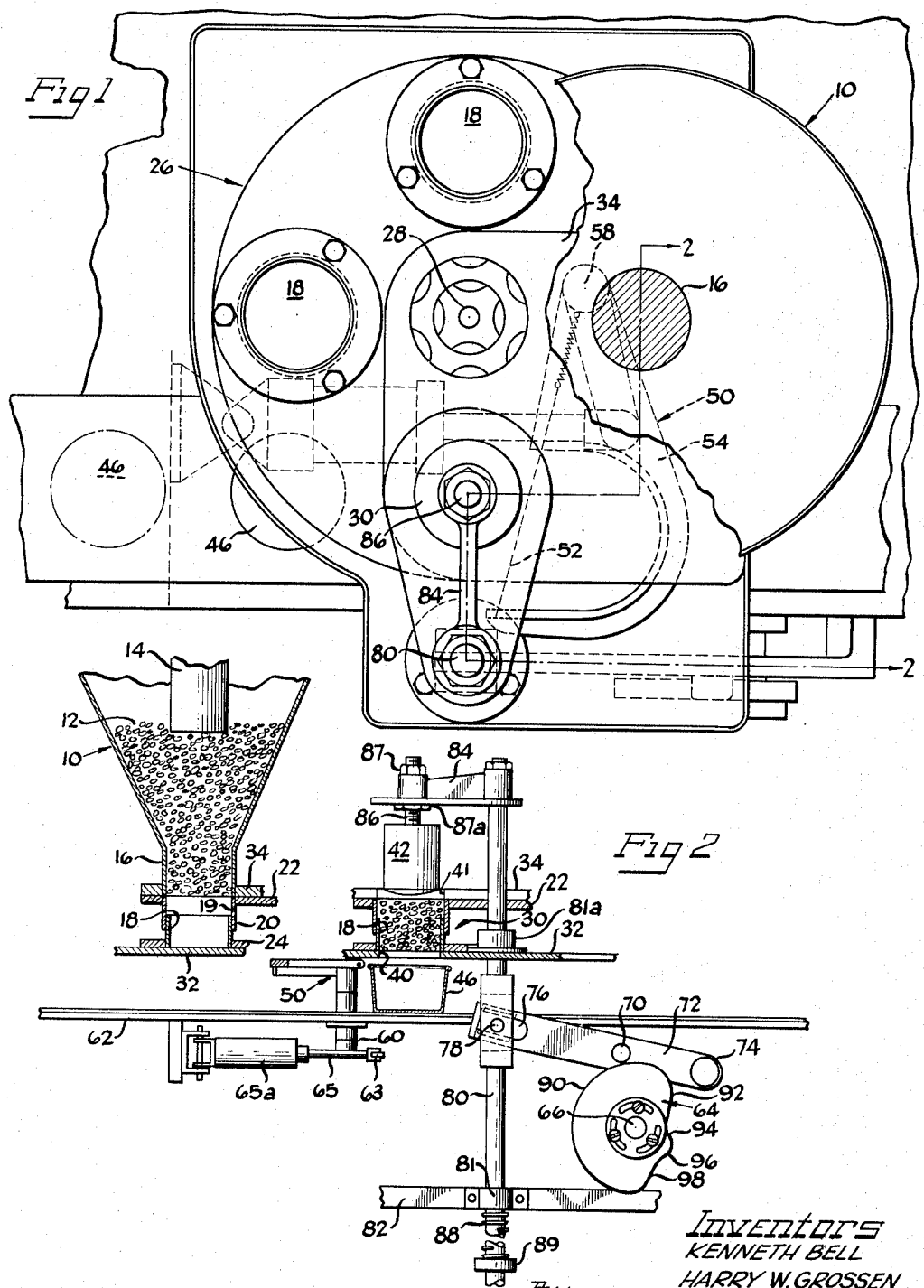

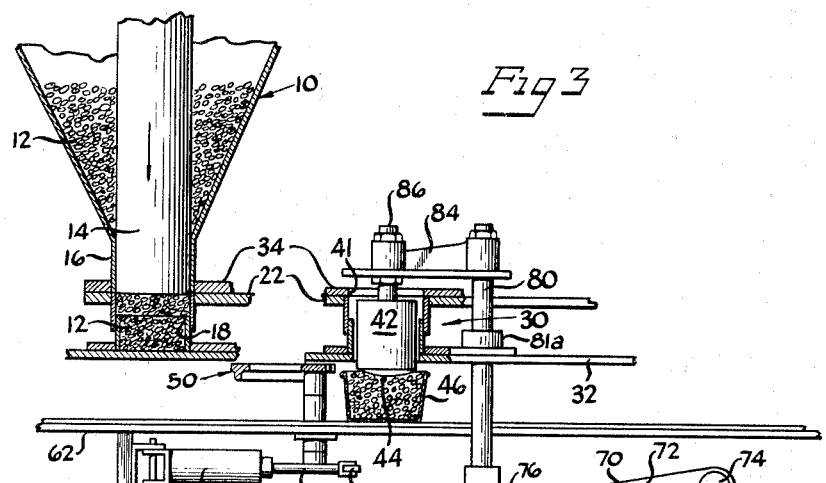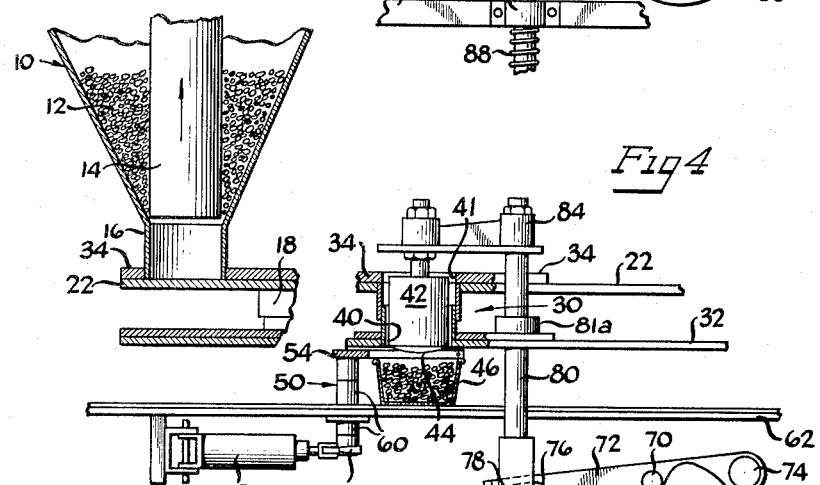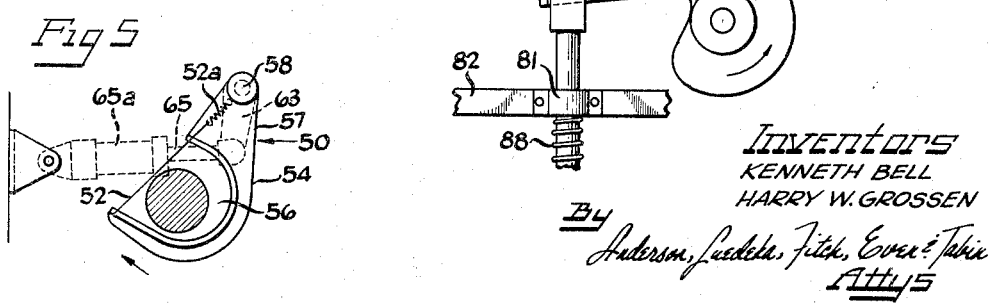

3,217,944
DISPENSER WITH CLEARING MEANS
Kenneth Bell, Marengo, and Harry W. Grossen, Chicago, Ill., assignors to National Dairy Products Corporation, New York, N.Y., a corporation of Delaware
Filed Nov. 5, 1963, Ser. No. 321,609
7 Claims. (Cl. 222—350)

This invention relates generally to metering and dispensing food products which are sensitive to shear, and more particularly, to apparatus for measuring and dispensing predetermined quantities of cottage cheese.

Cottage cheese is generally available as dry or creamed curd and is packaged in different curd sizes, such as small curd or large curd. Packaged cottage cheese is generally sold on a weight basis, for example, in pound or half-pound containers. Because the curd is sensitive to shearing stress, any such stress applied to the cottage cheese must be carefully regulated and limited. However, because of the irregular shape of the curd, the resulting voids vary considerably and equal volume portions of cottage cheese can vary considerably in weight. Thus, if volumetric methods of measuring equal weight portions of cottage cheese are used, it is necessary to compress the cottage cheese. In dispensing compressed, measured portions of cottage cheese some of the curds may adhere to the dispensing apparatus and to assure that the correct minimum weight is provided, excess amounts of cottage cheese may have to be deposited in each package, thus increasing the cost.

It is, therefore, the primary object of this invention to provide an improved apparatus for metering and dispensing cottage cheese.

Another object is provision of new and useful apparatus for dispensing portions of cottage cheese in accurately determined amounts.

A more specific object of the invention is provision of improved apparatus for dispensing accurate weight portions of cottage cheese with minimum clinging of cottage cheese to the apparatus.

These and other objects of the invention are more particularly set forth in the following detailed description, and in the accompanying drawings in which:

FIGURE 1 is a fragmentary plan view, partially in cross-section, of cottage cheese metering apparatus in accordance with the invention, with parts broken away for clearer illustration;

FIGURE 2 is a fragmentary side view taken generally along the line 2—2 in FIGURE 1 a plunger being shown in a first, withdrawn position;

FIGURE 3 is a view similar to FIGURE 2, but with the plunger in a second and lowermost position having caused dispensing of cottage cheese;

FIGURE 4 is a view similar to FIGURES 2 and 3, but with the plunger in a third position during its return to the first position; and FIGURE 5 is a fragmentary plan view, with parts broken away and in section for clearer illustration, of means for removing cottage cheese from the plunger.

The invention is, in brief, directed to metering and dispensing apparatus particularly adapted for cottage cheese and, more particularly, it is directed to means for ejecting substantially all cottage cheese from a measuring chamber associated with said apparatus into a container.

Referring to the drawings, the apparatus of the invention includes a hopper 10 for receiving cottage cheese curd 12. A loading member 14 is mounted for vertical movement in the hopper 10 and, upon downward movement of the loading member 14 from the position shown in FIGURE 2 to the position shown in FIGURE 3, the portion of cottage cheese 12 below the loading member is compressed and moves through a lower neck portion 16 of the hopper 10 and into a measured chamber 18, as shown in FIGURE 3.

The measured chamber 18 is in the form of a vertical cylinder having upper and lower cylindrical sections 19 and 20. The upper section 19 is attached at its upper end to an upper carrier plate 22 and the lower section 20 is attached at its lower end to a lower carrier plate 24. The lower section 20 telescopes into the upper section 19.

In the illustrated embodiment, the carrier plates 22 and 24 are parallel to each other and form a turntable 26 (FIGURE 1) including four of the previously described measured chambers 18 circumferentially disposed on the turntable 90 degrees from each other. The turntable is connected at its center to a drive shaft 28 rotated step by step in a clockwise direction, as viewed in FIGURE 1, to move the measured chambers 18 step by step from a filling station at the hopper 10 to a dispensing station 30 which is 90 degrees from the loading station. Indexing of the turntable 26 between the loading and dispensing stations may be provided in any suitable manner as is well understood in the art.

The lower carrier plate 24 rests on a bottom plate 32 so that the cylindrical side walls 20 of the measured chambers 18 are effectively sealed by the bottom plate 32 to thereby contain the cottage cheese in the measured chamber until it is ready for discharge. Between the hopper 10 and the unloading station 30, the upper face of the upper carrier plate 22 is covered with a top plate 34. The top plate 34 has an opening which snugly receives the lower end of the hopper neck portion 16 so that the loading member 14 may move the cottage cheese 12 into a measured chamber 18, when it is axially aligned with the hopper neck 16.

With reference to FIGURE 3, it should be noted that when the loading member 14 is in its lower most position, its bottom end is generally co-planar with the bottom face of the top plate 34. Thus, upon rotation of the turntable 26, the measured chamber 18 is rotated out of communication with the hopper neck portion 16, but the cottage cheese 12 within the measured chamber 18 remains compressed between the bottom plate 32 and the top plate 34.

When a measured chamber 18, which is loaded with compressed cottage cheese, is rotated between the bottom plate 32 and the top plate 34, it is moved to the unloading station 30 and into axial alignment with an unloading port 40 in the bottom plate 32. At the same time, the measured chamber 18 moves under a port 41 in the top plate 34. When a measured chamber moves to the unloading station 30, another measured chamber 18 moves into axial alignment with the hopper neck portion 16 to be loaded with cottage cheese by means of the loading member 14. While a measured chamber is moving between the loading and unloading stations, the loading member 14 moves upwardly, as shown in FIGURE 4, so that the cottage cheese 12 may slide or be moved by a suitable stirrer (not shown) into the hopper neck portion 16 preparatory to loading of another measured chamber 18.

As a loaded measured chamber 18 moves into operative position at the unloading station 30, an unloading plunger 42 moves downwardly through the port 41, the chamber 18 and the unloading port 40 to a position in which a lower face 44 of the plunger 42 is below the lower plate 32 and the cottage cheese is thereby ejected from the measured chamber 18 into a container 46 below the measured chamber. Thus, substantially all of the cottage cheese is moved out of the measured chamber and into container 46.

After discharging the cottage cheese into the container, the plunger 42 then moves upwardly slightly to a wiping position in which its lower face 44, which is generally convex, is still below the lower face of the lower plate 32, and in this position upward movement of the plunger pauses.

While the plunger 42 is in the wiping position, a wiper assembly 50 (FIGURE 5) is actuated to wipe any cottage cheese off of the lower face 44 of the plunger, and any cottage cheese on the lower face drops into the container 46 which is then moved away and an empty container is moved into position at the unloading station.

As shown in FIGURE 5, the wiper assembly 50 includes a wire 52 carried on a harp 54 having a U-shaped opening 56. The wire 52 is held under tension by means of a spring 52a at one end and extends across. The wire is secured to the harp 54 at the other end. The spring 52a permits the wire to conform to the configuration of the lower face 44 of the plunger so as to effectively wipe substantially all cottage cheese therefrom. The harp 54 is positioned immediately below the lower plate 32.

The harp 54 is connected to an arm 57 which is fixedly connected to a depending shaft 58 journalled in bosses, as 60 (FIGURE 4). The bosses are disposed on opposite sides of the frame 62 of the apparatus of the invention. The lower end of the depending shaft 58 connects to an arm 63 at one end and is connected at the other end to a harp actuating mechanism, such as a piston rod 65 of a reciprocating pneumatic motor 65a which is operable to swing the harp 54 and the wire 52 in a horizontal plane across the lower convex face 44 of the plunger 42.

The unloading plunger 42 is cam actuated so that as a measured chamber 18 moves into axial alignment with the unloading ports 40 and 41 in the top and bottom plates 32 and 34, the plunger 42 moves downwardly to unload the measured chamber 18. Such movement is effected by a cam 64 mounted on a continuously rotating cam shaft 66 suitably journalled on the frame 62 of the apparatus. The cam 64 has an outer peripheral cam edge 68 on which a follower 70 rides. The follower 70 is carried on an arm 72, one end of which is carried on a pivot 74 on the frame 62. The other end of the arm 72 is provided with an elongated slot 76 which slidably receives a lug 78 connected to a vertical rod 80. The rod 80 is slidably received in guide means comprising a lower bracket 81 on the frame 62 and collar 81a mounted on the lower plate 32. The rod 80 is preferably of non-circular cross-sectional configuration and the guide means are of similar configuration to hold the rod against rotation. A horizontal arm 84 rigidly interconnects the upper end of the rod 80 and a threaded stem 86 extending upwardly from the plunger 42 so that the plunger moves with the rod. Suitable nuts 87 and 87a threaded on the stem 86 above and below the arm 84 provide adjustable positioning of the plunger 42 relative to the measured chambers 18.

The rod 80 is biased downwardly by means of a spiral compression spring 88 fitted onto a lower portion of the rod 80 between the bracket 81 and collar 89 fixed to the rod below the bracket.

When a measured chamber 18 is in alignment with the unloading port 40 in the bottom plate 32, rotation of the cam 68 causes the follower 70 to be moved from a long circular section 90 of the cam 68 onto a declining portion 92 of the cam so that the arm 72 can move downwardly because of the pull of the spring 88. As a consequence, the rod 80 and the plunger 42 move downwardly. The plunger moves downwardly (to the position shown in FIGURE 3) through the measured chamber 18 to discharge the cottage cheese into the container 46. At the bottom of the stroke of the plunger 42, the cam follower 70 is engaged by a first elevating portion 94 of the cam peripheral edge whereupon the plunger 42 moves upwardly to the wiping position shown in FIGURE 4. Continued counterclockwise rotation of the cam 64 causes the cam follower 70 to ride across a circular section 96 of a cam peripheral edge, thus retaining the plunger 42 in wiping position until the cam rotates sufficiently so that the cam follower 70 rides across a second elevating portion 98 of the cam which lifts the plunger 42 from the wiping position shown in FIGURE 4 to an elevated position with the follower 70 on the long circular cam section 90, as shown in FIGURE 2. Both circular cam sections 90 and 96 have centers which are concentric with the cam shaft 66.

The wiping assembly includes means for actuating the pneumatic motor 65a when the plunger 42 is in the wiping position shown in FIGURE 4, to swing wiping wire 52 across the lower face 44 of the plunger. Various actuating means may be used within the skill of the art and in said connection, the cam shaft 66 may carry a cam which actuates a control valve for operating the pneumatic motor 65a.

To summarize the operation of the invention, a measured chamber 18 is filled with compressed cottage cheese from the hopper 10 and is then rotated between the bottom plate 32 and the top plate 34 until a measured chamber moves to the unloading station 30 and into alignment with the ports 40 and 41 in the bottom and top plates. The continuously rotating cam shaft 66 then causes the rod 80 to slide downwardly, thereby moving the plunger 42 downwardly through the port 41 and the measured chamber 18 aligned therewith to discharge the cottage cheese through the unloading port 40 into a container 46 positioned below. Continued rotation of the cam shaft 66 causes the plunger 42 to move upwardly to the wiping position shown in FIGURE 4. In the wiping position, the lower convex face 44 of the plunger pauses below the lower plate 32 and the pneumatic motor 65a is actuated to swing the wire 52 across the lower face 44 of the plunger 42, thus causing any cottage cheese clinging to this face to drop downwardly into the container 46.

While this invention has been described with reference to certain structure and operation in a particular environment, various changes may be apparent to one skilled in the art, and the invention is, therefore, not to be limited to such structure, operation or environment.

Various features of the invention are set forth in the following claims.

What is claimed is:

1. In apparatus for packaging cottage cheese in measured portions, the combination of a frame, a measured chamber on said frame, a plunger mounted on said frame and positioned for movement through the measured chamber, said plunger having a face which engages cottage cheese in said measured chamber, actuating means for moving said plunger through the measured chamber, and wiping means on said frame positioned to engage said face.

2. In apparatus for packaging cottage cheese in measured portions, the combination of a frame, a measured chamber on said frame, a plunger mounted on said frame and positioned for movement through the measured chamber, said plunger having a face which engages cottage cheese in said measured chamber, actuating means for moving said plunger through the measured chamber, and wiping means on said frame positioned to engage said face, said wiping means including a wire and means for supporting said wire.

3. In apparatus for packaging cottage cheese in measured portions, the combination of a frame, a measured chamber on said frame, a plunger mounted on said frame and positioned for movement through the measured chamber, said plunger having a face which engages cottage cheese in said measured chamber, actuating means for moving said plunger through the measured chamber and wiping means on said frame positioned to engage said face, said wiping means including a wire, support means for said wire and tensioning means connected between said wire and said support means.

4. In apparatus for packaging cottage cheese in measured portions, the combination of a frame, a measured chamber on said frame, a plunger mounted on said frame and positioned for movement through the measured chamber, said plunger having a face which engages cottage cheese in said measured chamber, actuating means for moving said plunger through the measured chamber, said actuating means including a rod connected to said plunger, and a cam connected to said rod, said cam having a surface which holds said rod in a raised position, a second surface which causes said plunger to move through said measured chamber, a third surface which returns said plunger toward said measured chamber and a fourth surface which holds said face of said plunger outside said measured chamber, and wiping means on said frame positioned to engage said face when said fourth surface of said cam is operable.

5. In apparatus for packaging cottage cheese in measured portions, the combination of a frame, a measured chamber on said frame, a plunger mounted on said frame and positioned for movement through the measured chamber, said plunger having a face which engages cottage cheese in said measured chamber, actuating means for moving said plunger through the measured chamber, said actuating means including a rod connected to said plunger, and a cam connected to said rod, said cam having a surface which holds said rod in a raised position, a second surface which causes said plunger to move through said measured chamber, a third surface which returns said plunger toward said measured chamber and a fourth surface which holds said face of said plunger outside said measured chamber, and wiping means on said frame positioned to engage said face when said fourth surface of said cam is operable, said wiping means including a wire and means for supporting said wire.

6. In apparatus for packaging cottage cheese in measured portions, the combination of a frame, a measured chamber on said frame, a plunger mounted on said frame and positioned for movement through the measured chamber, said plunger having a convex face which engages cottage cheese in said measured chamber, actuating means for moving said plunger through the measured chamber, said actuating means including a rod connected to said plunger, and a cam connected to said rod, said cam having a surface which holds said rod in a raised position, a second surface which causes said plunger to move through said measured chamber, a third surface which returns said plunger toward said measured chamber and a fourth surface which holds said face of said plunger outside said measured chamber, and wiping means on said frame positioned to engage said face when said fourth surface of said cam is operable, said wiping means including a wire under tension.

7. In apparatus for packaging cottage cheese in measured portions, the combination of a frame, a measured chamber on said frame, a plunger mounted on said frame and positioned for movement through the measured chamber, said plunger having a convex face which engages cottage cheese in said measured chamber, actuating means for moving said plunger through the measured chamber, said actuating means including a rod connected to said plunger, and a cam connected to said rod, said cam having a surface which holds said rod in a raised position, a second surface which causes said plunger to move through said measured chamber, a third surface which returns said plunger toward said measured chamber and a fourth surface which holds said face of said plunger outside said measured chamber, and wiping means on said frame positioned to engage said face when said fourth surface of said cam is operable, said wiping means including a wire, supporting means for said wire and a spring connected between said wire and said supporting means.

No references cited.

EVERETT W. KIRBY, *Primary Examiner.*